United States Patent
Patel et al.

(10) Patent No.: US 10,254,026 B2
(45) Date of Patent: Apr. 9, 2019

(54) CONTROL ALGORITHM FOR ELECTRONIC EXPANSION VALVE MODULATION

(75) Inventors: Tejendra Patel, Ellington, CT (US); Jeffrey Ernst, Wethersfield, CT (US); Bruce R. Schroder, Agawam, MA (US); Robert M. DeRoy, Tolland, CT (US); Kokjovi Coussey, Manchester, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1597 days.

(21) Appl. No.: 13/091,705

(22) Filed: Apr. 21, 2011

(65) Prior Publication Data

US 2012/0266623 A1  Oct. 25, 2012

(51) Int. Cl.
F25B 41/06 (2006.01)

(52) U.S. Cl.
CPC .... *F25B 41/062* (2013.01); *F25B 2341/0653* (2013.01); *F25B 2400/075* (2013.01); *F25B 2500/07* (2013.01); *F25B 2600/21* (2013.01); *F25B 2600/2513* (2013.01); *F25B 2700/197* (2013.01); *F25B 2700/21172* (2013.01); *F25B 2700/21175* (2013.01); *Y02B 30/72* (2013.01)

(58) Field of Classification Search
CPC .............. F25B 2600/2513; F25B 2700/21172
USPC ......... 62/125, 127, 157, 216, 222, 224, 225, 62/208
See application file for complete search history.

(56) References Cited

U.S. PATENT DOCUMENTS

| 4,069,030 | A | * | 1/1978 | Nickell ................... F24F 11/00 165/251 |
| 4,547,977 | A | * | 10/1985 | Tenedini et al. ................ 34/538 |
| 4,689,968 | A | * | 9/1987 | McCulloch et al. ............ 62/225 |
| 5,319,945 | A | | 6/1994 | Barlett |
| 5,632,154 | A | | 5/1997 | Sibik et al. |
| 5,809,794 | A | | 9/1998 | Sibik et al. |
| 7,612,510 | B2 | * | 11/2009 | Koehl ...................... 318/400.21 |

(Continued)

FOREIGN PATENT DOCUMENTS

| CN | 1275705 A | 10/2000 |
| CN | 1275705 A | 12/2000 |

(Continued)

OTHER PUBLICATIONS

The Extended European Search Report for European Patent Application No. 12163859.7, dated May 3, 2016, 7 pages.

(Continued)

*Primary Examiner* — Ned Landrum
*Assistant Examiner* — Daniel C Comings
(74) *Attorney, Agent, or Firm* — Kinney & Lange, P.A.

(57) ABSTRACT

An electronic expansion valve (EEV) is employed in refrigeration systems to regulate the flow of refrigerant through an evaporator. The position of the EEV is controlled through a first control loop that generates a first position signal based on superheat feedback associated with the refrigeration system, and a second control loop that generates a second position signal based on pressure feedback associated with the refrigeration system. The larger of the first position signal and the second position signal is selected to control the position of the EEV value, and the selected position signal is provided in feedback to both the first control loop and the second control loop.

23 Claims, 2 Drawing Sheets

(56) References Cited

U.S. PATENT DOCUMENTS

| | | | | |
|---|---|---|---|---|
| 2004/0068999 | A1* | 4/2004 | Jessen | 62/222 |
| 2006/0059926 | A1* | 3/2006 | McCormick et al. | 62/129 |
| 2010/0064723 | A1* | 3/2010 | Kawakatsu | 62/507 |
| 2012/0192579 | A1* | 8/2012 | Huff et al. | 62/115 |

FOREIGN PATENT DOCUMENTS

| | | |
|---|---|---|
| JP | H11501114 A | 1/1990 |
| WO | WO2009039850 A1 | 4/2009 |

OTHER PUBLICATIONS

The First Office Action dated Mar. 31, 2015 for Chinese Patent Application No. 201210117347.5.
The Chinese Search Report dated Mar. 22, 2015 for Chinese Application No. 201210117347.5.
Third Chinese Office Action for Chinese Patent Application No. 201210117347.5, dated Aug. 2, 2016, 6 pages.

\* cited by examiner

CONTROL ALGORITHM FOR ELECTRONIC EXPANSION VALVE MODULATION

BACKGROUND

The present invention is related to electronic expansion valves (EEVs) employed in refrigeration systems, and in particular to control algorithms used to regulate the position of the EEVs.

Vapor cycle refrigeration systems are commonly employed to provide cooling. A typical vapor cycle refrigeration system includes an evaporator, a compressor and an electronic expansion valve (EEV). Refrigerant is provided to the evaporator in a two-phase state (i.e., a combination liquid-gaseous state), wherein the refrigerant in the evaporator absorbs heat via latent heat transfer through an evaporation process in which the refrigerant is converted to a purely gaseous state. The heated refrigerant provided at an output of the evaporator is received by a compressor. To avoid excessive power demands and/or damage to the compressor, it is important that the refrigerant received by the compressor be in a purely gaseous state. However, to minimize power consumption and maximize the coefficient of performance associated with the system, it is important to minimize the temperature of the refrigerant entering the compressor.

The temperature and state of the refrigerant exiting the evaporator is based, in part, on the flow of refrigerant through the evaporator. The flow of refrigerant through the evaporator is a function of the compressor speed and the position (i.e., opened/closed) of the electronic expansion valve (EEV). If too much refrigerant flow is provided for the amount of heat absorbed in the evaporator, then the refrigerant provided at the output of the evaporator will remain in the liquid state. If insufficient refrigerant flow is provided to the evaporator, then all of the refrigerant will evaporate and will continue to absorb heat within the evaporator, such that the refrigerant provided at the output of the evaporator has a greater than desired temperature.

The electronic expansion valve is used to regulate the flow of refrigerant within the refrigeration circuit such that the refrigerant exiting the evaporator is in the gaseous state, but not above a desired temperature.

SUMMARY

A position of an electronic expansion valve (EEV) employed in a refrigeration system is controlled with a first control loop that generates a first EEV step signal based on superheat feedback associated with the refrigeration system and a second control loop that generates a second EEV position signal based on pressure feedback associated with the refrigeration system. One of either the first EEV step signal or the second EEV step signal is selected as the position signal employed to control the position of the EEV. The selected position signal is provided in feedback to both the first control loop and the second control loop.

DETAILED DESCRIPTION

Figure 1:
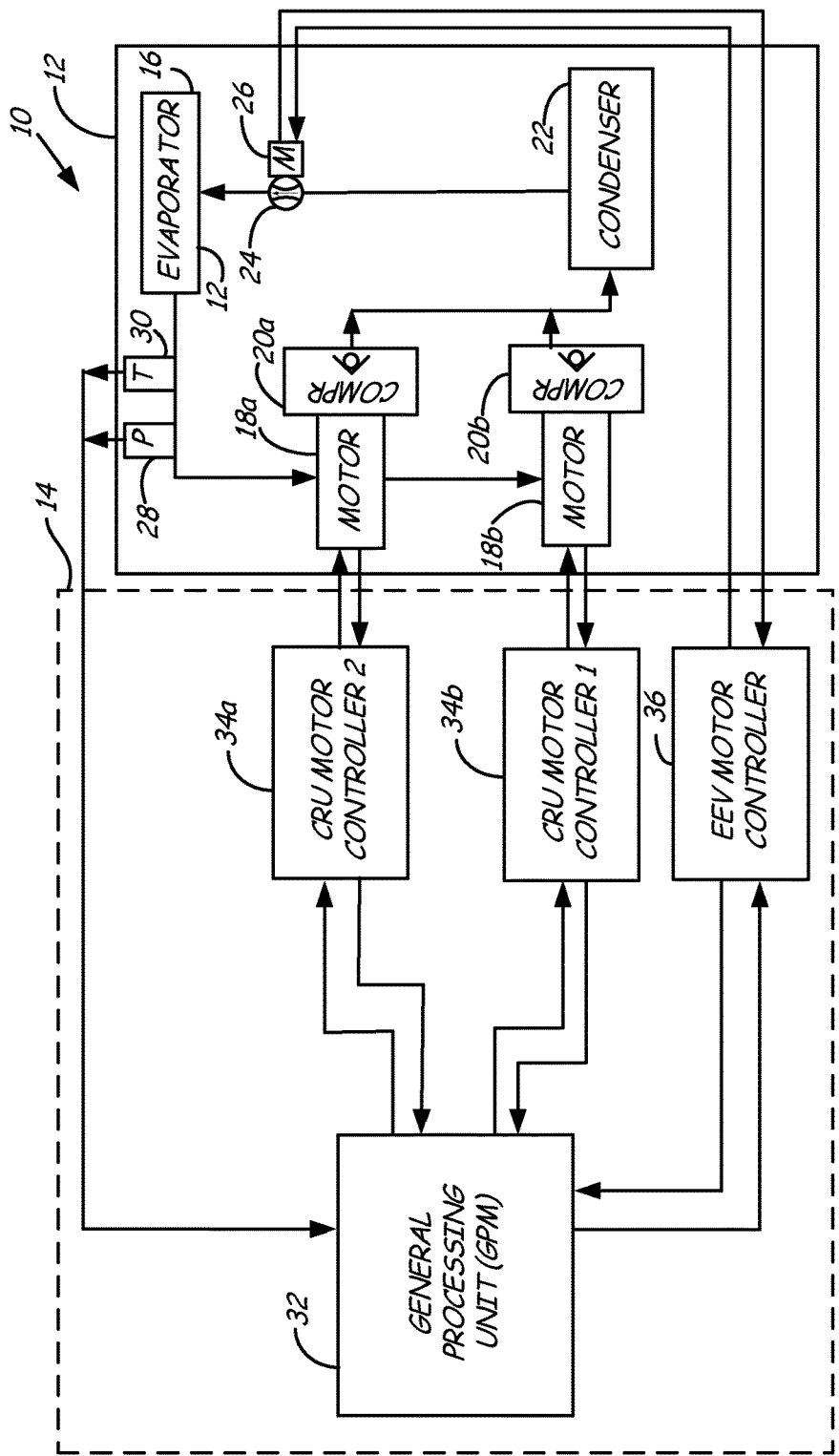
FIG. 1 is a block diagram of a refrigeration and control system according to an embodiment of the present invention.

FIG. 1 is a block diagram of a refrigeration and control system 10 according to an embodiment of the present invention. System 10 includes refrigeration system 12 and control system 14. Refrigeration system 12 includes evaporator 16, motors 18a, 18b, compressors 20a, 20b, condenser 22, electronic expansion valve (EEV) 24, and EEV motor 26. The arrowed lines extending between evaporator 16, compressor motors 18a, 18b, condenser 22, and EEV 24 indicate the flow and direction of refrigerant circulated in refrigeration system 12. The configuration of elements in refrigeration system 12 is exemplary, and other configurations of components may be employed.

Control system 14 includes processing unit 32, compressor motor controllers 34a, 34b, and EEV motor controller 36. Processing unit 32 monitors the operation of refrigeration system 12, including receiving feedback at the output of evaporator 16 from pressure sensor 28 and temperature sensor 30. Based at least in part on these values, processing unit provides control instructions to motor controllers 34a, 34b to control the speed of compressor motors 18a, 18b and control instructions to EEV motor controller 36 to selectively position (i.e., open/close) EEV 24.

Refrigeration system 12 operates by passing refrigerant in a two-phase state (i.e., combined liquid-gaseous state) to evaporator 16. The refrigerant flowing through evaporator 16 absorbs heat via latent heat transfer in an evaporation process that converts the refrigerant to a purely gaseous state. Compressors 20a, 20b are driven by motors 18a, 18b, respectively, to a desired speed. In the embodiment shown in FIG. 1, a pair of compressors are employed, connected in parallel with one another. In other embodiments, a single compressor may be used instead. Compressors 20a, 20b compress the gaseous refrigerant provided by evaporator 16, and provide the compressed gaseous refrigerant to condenser 22. In turn, condenser 22 condenses the gaseous refrigerant back into a liquid or mixed liquid-gaseous state, and provides the condensed refrigerant to a liquid pool (not shown) or directly to electronic expansion valve (EEV) 24 for supply to evaporator 16. EEV motor 26 controls the position of EEV 24 (i.e., opens/closes) to regulate the flow of refrigerant provided to evaporator 16.

To avoid excessive power demands and/or damage to compressors 20a, 20b, it is important that the refrigerant received by compressors 20a, 20b be in a purely gaseous state. However, to minimize power consumption and maximize the coefficient of performance associated with the system, it is important to minimize the temperature of the refrigerant entering compressors 20a, 20b.

The temperature and state of the refrigerant exiting evaporator 16 is dependent, in part, on the flow of refrigerant through the evaporator and the temperature of supply air entering the evaporator. The flow of refrigerant through evaporator 16 is a function of the compressor speed and the position (i.e., opened/closed) of EEV 24. If too much refrigerant flow is provided for the amount of heat absorbed in evaporator 16, then the refrigerant provided at the output of evaporator 16 will remain in the two phase state or liquid state. If insufficient refrigerant flow is provided to evaporator 16, then all of the refrigerant will evaporate and will continue to absorb heat within evaporator 16, such that the refrigerant provided at the output of evaporator 16 has a greater than desired temperature. Thus, the position of EEV 24 is important to ensuring the proper operation of refrigeration system 12.

In the embodiment shown in FIG. 1, processing unit 32 executes an EEV control algorithm to selectively control the flow of refrigerant to evaporator 16 by selectively controlling the position of EEV 24. The EEV control algorithm consists of two control loops: a superheat (SH) control loop that is based on the temperature of the refrigerant at the output of evaporator 16, and a maximum operating pressure (MOP) control loop that is based on the pressure of the refrigerant at the output of evaporator 16. During normal operation, the SH control algorithm controls the position of EEV 24 such that the refrigerant temperature is maintained at a desired value (e.g., 18 degrees above a saturated vapor line associated with the refrigerant). The MOP control algorithm takes over when necessary to maintain the MOP below a desired maximum operating pressure (MOP). In particular, the EEV control algorithm of the present invention acts to smooth transitions between the SH control algorithm and the MOP control algorithm.

Figure 2:
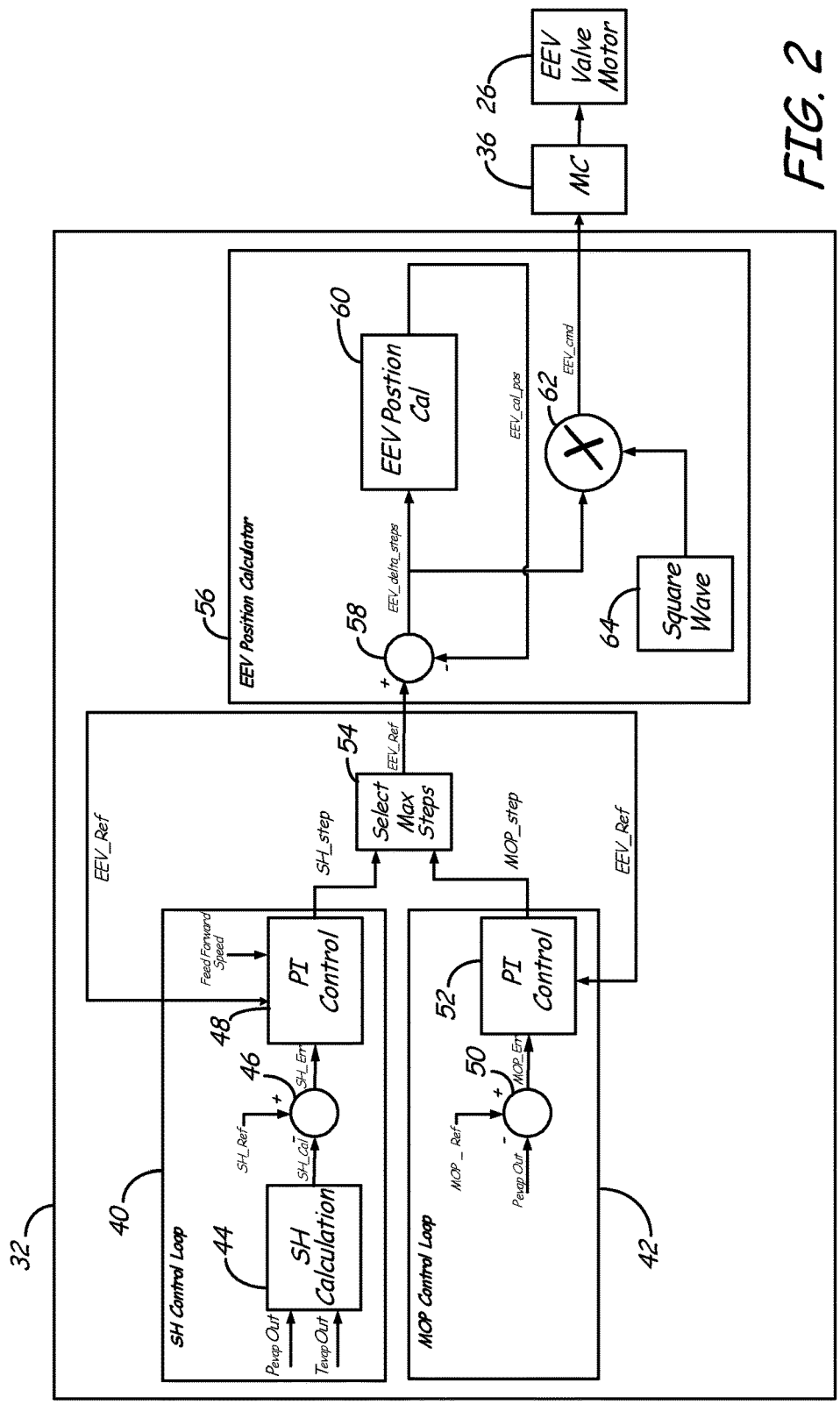
FIG. 2 is a functional block diagram illustrating operations performed by the processor unit to implement the EEV control algorithm according to an embodiment of the present invention.

FIG. 2 is a functional block diagram illustrating operations performed by processor unit 32 to implement the EEV control algorithm according to an embodiment of the present invention. Control instructions provided as a result of the EEV control algorithm are provided to EEV motor controller 36, which commands EEV motor 24 to a desired position based on the received control instructions.

The EEV control algorithm includes superheat (SH) control loop 40 and maximum operating pressure (MOP) control loop 42. The SH control loop 40 receives as inputs the monitored pressure Pevap_out and temperature Tevap_out of the refrigerant at the output of evaporator 16, provided by pressure sensor 28 and temperature sensor 30, respectively. The monitored pressure Pevap_out and temperature Tevap_out are provided to SH calculator 44, which generates in response a superheat value SH_cal. Superheat is defined as the difference between the temperature at which the refrigerant boils at the given pressure in the evaporator, and the temperature of the refrigerant gas as it leaves the evaporator. Therefore, the calculation of a superheat value SbH_cal is based on both the pressure Pevap_out and temperature Tevap_out monitored at the output of evaporator 16. To avoid liquid refrigerant from being provided to compressors 20a, 20b, the desired superheat of the refrigerant should be greater than zero. Typically, to provide some room for error the superheat value is maintained at a value greater than zero (e.g., 18 degrees superheat) to ensure a gaseous output at evaporator 16.

The calculated superheat value SH_cal is compared to a desired superheat value SH_ref at block 46 to calculate the difference or error SH_err between the desired superheat value and the measured or calculated superheat value. The calculated error SH_err is provided to proportional-integral (PI) control block 48, which calculates a superheat step output SH_step that represents the desired position (i.e., steps of opening/closing) of EEV 24 based on superheat feedback. For example, a calculated superheat value SH_cal that is greater than the superheat reference SH_ref may result in an opening of EEV 24 to increase the flow of refrigerant into evaporator 16. Conversely, a calculated superheat value SH_cal that is less than the superheat reference SH_ref may result in a closing of EEV 24 to decrease the flow of refrigerant into evaporator 16.

The MOP control loop 42 receives as input the monitored pressure Pevap_out of the refrigerant at the output of evaporator 16. The monitored pressure Pevap_out is compared to a threshold pressure value MOP_ref at block 50 to calculate a difference or error MOP_err between the desired pressure value and the measured pressure value. The calculated error MOP_err is provided to PI control block 52, which calculates a pressure step output MOP_step that represents the desired position (i.e., steps of opening/closing) of EEV 24 based on the pressure feedback.

Selector block 54 receives both the SH step output SH_step and the MOP step output MOP_step from SH control loop 40 and MOP control loop 42, respectively, and selects the step output representing the greatest number of closed steps (i.e., the most closed position of the EEV 24) between the respective step outputs for provision to EEV position calculator 56 as the EEV reference value EEV_ref. In this way, although both control loops 40, 42 provide an output regarding the desired position of EEV 24, only one control loop is effectively "in control" of the position of EEV 24. Although only one control loop is effectively controlling the position of EEV 24 at any given time, the selected maximum closed value EEV_ref is provided as feedback to the "not in control" loop integrator. In this way, the "not in control" loop integrator function of each P-I control block 48, 52 is outputting the same value that is being calculated (continuously reset) by the "in control" loop. In one embodiment, each loop integrator associated with P-I control blocks 48, 52 has a low limit and a high limit that ensure the output of the integrator is maintained within the defined limits. In this embodiment, feedback provided to the "not in control" loop integrator is provided to the low limit input of the loop integrator, thereby maintaining the output of the "not in control" loop very close to the output of the "in control" loop. A benefit of this arrangement is it reduces dramatic changes in the step output EEV_ref provided to EEV position calculator 56 when control switches from SH control block to MOP control block 42, or vice versa. That is, providing the step output of the "in control" control loop in feedback to the "not in control" control loop has the effect of smoothing out transitions between the two control loops (i.e. bumpless transitions).

In addition, in one embodiment PI control block 48 included within SH control loop 40 employs non-linear gain functionality. In particular, when the calculated superheat value SH_cal falls below the superheat reference SH_ref, this represents a situation in which liquid may be provided to compressors 20a, 20b, with potentially catastrophic consequences. This is therefore more critical than a condition in which the calculated superheat value SH_cal is greater than the superheat reference SH_ref. Employing a non-linear gain function allows the response provided by P-I controller 48 to be more dynamic (i.e., faster response, in which the gain is larger) when the calculated superheat value SH_cal is below the superheat reference SH_ref. In other, less critical regions, a smaller gain value may be employed. The non-linear gain input implements variable gains to accommodate variations in the dynamic response of evaporator 16 as a function of the superheat error SH_Err.

In another embodiment, P-I controller 48 receives feed-forward speed inputs to account for the effect of changes in compressor speed have on the superheat of the refrigerant. For example, an increase in compressor speed (due to increased cooling demands) decreases the pressure of the refrigerant at the output of evaporator 16 due to additional suction at the inlet of compressors 20a, 20b. As a result, the superheat of the refrigerant decreases due to the significantly higher flow of refrigerant through evaporator 16 despite no change in position of EEV 24. To compensate for the effects of compressor speed on the superheat, the speed of compressors 20a, 20b are fed-forward to P-I controller 48 to minimize variations in the superheat value. In one embodiment, the feed-forward speed input is represented as a rate of change of the speed of compressors 20a, 20b that is added to the input of the integrator function within P-I controller 48. For example, an increase in the speed of compressors 20a, 20b results in a positive value (representing a positive rate of change) being added to the integrator input of P-I controller 48, which increases the gain and therefore response time of P-I controller 48. In other embodiments, the feed-forward speed is provided downstream of the integrator function of P-I controller 48. In these embodiments, the feed-forward speed input may be provided as a speed value, a rate of change value, etc that are used to accommodate changes in compressor speed.

Based on the step output EEV_ref provided by selector block 54, EEV position calculator 56 calculates an EEV command EEV_Cmd for provision to EEV motor controller 36. In the embodiment shown in FIG. 2, EEV position calculator 56 does not receive feedback regarding the position of EEV 24. To compensate, EEV position calculator 56 includes a mechanism for pre-positioning EEV 24 to a particular position (e.g., fully closed) and tracking all subsequent changes to the position of EEV 24 to maintain a current position of EEV 24. In other embodiments, the position of EEV 24 may be provided in feedback to EEV position calculator 56, thereby obviating the need for continuous monitoring/tracking of EEV position (but requiring additional hardware/sensors for detecting the position of EEV 24).

In the embodiment shown in FIG. 2, the step output EEV_ref representing the desired position of EEV 24 is compared to the current EEV position EEV_Cal_Pos by block 58 to calculate a difference value EEV_delta_steps that represents the steps of opening/closing required to obtain the desired position of EEV 24. The calculated difference EEV_delta_steps is multiplied at block 62 with a square wave (provided by square wave generator 64) to generate EEV command signal EEV_Cmd for provision to EEV motor controller 36. In addition, the difference value EEV_delta_steps is provided to EEV position calculator 60, which uses the difference value (representing the change in position of EEV 24) to update the position estimate EEV_Cal_Pos of EEV 24. The calculated position estimate is based on knowledge of the initial position of EEV 24 as dictated by the input valve pre-position, and the opening/closing rate of EEV 24 as dictated by the modulation rate of square wave generator 64. In this way, EEV position calculator is able to maintain an accurate estimate of the position of EEV 24 despite a lack of feedback from the actual valve.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of controlling position of an electronic expansion valve (EEV) employed in a refrigeration system, the method comprising:
   generating, by a processing unit, a first EEV position control signal based on superheat feedback associated with the refrigeration system in a first control loop;
   generating, by the processing unit, a second EEV position control signal based on pressure feedback associated with the refrigeration system in a second control loop;
   comparing, by the processing unit, the first EEV position control signal and the second EEV position control signal;
   selecting, by the processing unit based on the comparison of the first EEV position control signal and the second EEV position control signal, either the first EEV position control signal or the second EEV position control signal as a selected position control signal employed to control position of the EEV;
   providing, by the processing unit, the selected position control signal in feedback to both the first control loop and the second control loop;
   outputting, by the processing unit, the selected position control signal to modify a position of the EEV; and
   modifying, based on the outputted selected position control signal, the position of the EEV.

2. The method of claim 1, wherein selecting either the first EEV position control signal or the second EEV position control signal based on the comparison of the first EEV position control signal and the second EEV position control signal includes selecting the one of the first EEV position control signal and the second EEV position control signal corresponding to a most closed position of the EEV.

3. The method of claim 1, wherein generating the first EEV position control signal includes:
   calculating a superheat value based on a monitored pressure and a monitored temperature associated with the refrigeration system;
   comparing the calculated superheat value to a reference superheat value to generate a superheat error value; and
   applying the superheat error value to a first proportional-integral controller to generate the first EEV position control signal.

4. The method of claim 3, wherein the selected position control signal is provided in feedback to reset an integrator value of the first proportional-integral controller.

5. The method of claim 3, wherein the first proportional-integral controller employs a non-linear gain function, wherein the first proportional-integral controller employs a larger gain value when the calculated superheat value is less than the reference superheat value, and a smaller gain value when the calculated superheat value is greater than the reference superheat value.

6. The method of claim 3, wherein the first proportional-integral controller receives feed-forward input regarding compressor speed to be included in calculation of the first EEV position control signal.

7. The method of claim 1, wherein generating the second EEV position control signal includes:
   comparing a monitored pressure associated with the refrigeration system to a maximum operating pressure (MOP) reference to generate a MOP error value; and
   applying the MOP error value to a second proportional-integral controller to generate the second EEV position control signal.

8. The method of claim 7, wherein the selected position control signal is provided in feedback to reset an integrator value of the second proportional-integral controller.

9. The method of claim 1, wherein outputting the selected position control signal to modify the position of the EEV further includes:
   calculating a valve position command signal by comparing the selected position control signal to a current valve position signal; and updating the current valve position signal based on the valve position command signal.

10. A controller system for controlling position of an electronic expansion valve (EEV) included in a refrigeration system, the controller system comprising:
an EEV motor controller that commands the EEV to a desired position; and
a processing unit that receives feedback regarding monitored pressure and temperature within the refrigeration system, the processing unit executing a superheat (SH) control loop that calculates a first EEV position control signal based on superheat feedback calculated based on the monitored pressure and temperature, the processing unit executing a maximum operating pressure (MOP) control loop that calculates a second EEV position control signal based on the monitored pressure of the refrigeration system, wherein the processing unit compares the first EEV position control signal and the second EEV position control signal and selects, based on the comparison of the first EEV position control signal and the second EEV position control signal, either the first EEV position control signal or the second EEV position control signal as a selected position control signal employed to control position of the EEV and provides the selected position control signal as feedback to both the SH control loop and the MOP control loop.

11. The controller system of claim 10, wherein the processing unit selects, based on the comparison of the first EEV position control signal and the second EEV position control signal, the one of the first EEV position control signal and the second EEV position control signal corresponding to a most closed position of the EEV as the position control signal employed to control position of the EEV.

12. The controller system of claim 10, wherein the SH control loop compares the superheat feedback to a desired superheat value to create a superheat error signal, the SH control loop including a first proportional-integral (P-I) controller that generates the first EEV position control signal based on the superheat error signal and the selected position control signal provided as feedback to both the SH control loop and the MOP control loop.

13. The controller system of claim 12, wherein the first P-I controller implements non-linear gain functionality, wherein the first P-I controller employs a larger gain value when the calculated superheat value is less than the reference superheat value, and a smaller gain value when the calculated superheat value is greater than the reference superheat value.

14. The controller system of claim 12, wherein the first P-I controller receives feed-forward speed inputs associated with speed of a compressor included as part of the refrigeration system, wherein the first EEV position control signal provided by the first P-I controller takes into account the effect compressor speed has on the superheat feedback.

15. The controller system of claim 10, wherein the MOP control loop compares the monitored pressure to a maximum operating pressure (MOP) reference value to create an MOP error signal, the MOP control loop including a second proportional-integral (P-I) controller that generates the second EEV position control signal based on the MOP error signal and the selected position control signal provided as feedback to both the SH control loop and the MOP control loop.

16. The controller system of claim 10, wherein the processing unit further includes an EEV delta step calculator that compares the selected position control signal to a current valve position signal to generate a valve command signal, and updates the current valve position signal based on the generated valve command signal.

17. A system comprising:
an evaporator for providing cooling to a medium based on evaporation of a refrigerant flowing through the evaporator;
an electronic expansion valve (EEV) selectively opened and closed to regulate the flow of refrigerant through the evaporator; and
a processing unit for regulating the flow of refrigerant through the evaporator through selective control of the opening and closing of the EEV, the processing unit executing a superheat (SH) control loop that calculates a first EEV position control signal based on superheat feedback calculated based on monitored pressure and temperature, the processing unit executing a maximum operating pressure (MOP) control loop that calculates a second EEV position control signal based on the monitored pressure, wherein the processing unit compares the first EEV position control signal and the second EEV position control signal and selects, based on the comparison of the first EEV position control signal and the second EEV position control signal, either the first EEV position control signal or the second EEV position control signal as a selected position control signal employed to control position of the EEV and provides the selected position control signal as feedback to both the SH control loop and the MOP control loop.

18. The system of claim 17, wherein the SH control loop compares the superheat feedback to a desired superheat value to create a superheat error signal, the SH control loop including a first proportional-integral (P-I) controller that generates the first EEV position control signal based on the superheat error signal and the selected position control signal provided as feedback to both the SH control loop and the MOP control loop.

19. The system of claim 18, wherein the first P-I controller implements non-linear gain functionality, wherein the first P-I controller employs a larger gain value when the calculated superheat value is less than a reference superheat value, and a smaller gain value when the calculated superheat value is greater than the reference superheat value.

20. The system of claim 18, wherein the first P-I controller receives feed-forward speed inputs associated with speed of a compressor included as part of the system, wherein the first EEV position control signal provided by the first P-I controller takes into account the effect compressor speed has on the superheat feedback.

21. The system of claim 17, wherein the MOP control loop compares the monitored pressure to a maximum operating pressure (MOP) reference value to create an MOP error signal, the MOP control loop including a second proportional-integral (P-I) controller that generates the second EEV position control signal based on the MOP error signal and the selected position control signal provided as feedback to both the SH control loop and the MOP control loop.

22. The system of claim 17, wherein the processing unit further includes an EEV delta step calculator that compares the selected position control signal to a current valve position signal to generate a valve command signal, and updates the current valve position signal based on the generated valve command signal.

23. The system of claim 17, wherein the processing unit selects the one of the first EEV position control signal and the second EEV position control signal corresponding to a most closed position of the EEV as the position control signal employed to control position of the EEV.

\* \* \* \* \*